June 10, 1969 L. M. BAXT ET AL 3,449,094
LAMINATED ELECTRETS
Filed Oct. 23, 1965
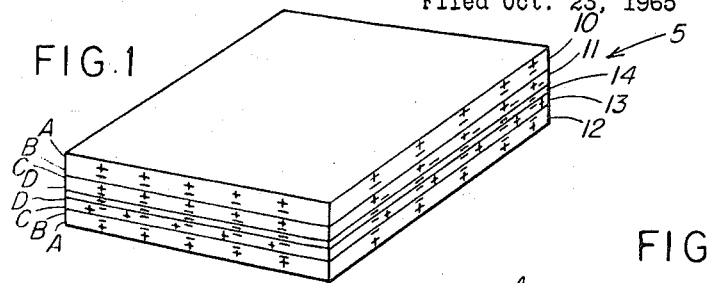
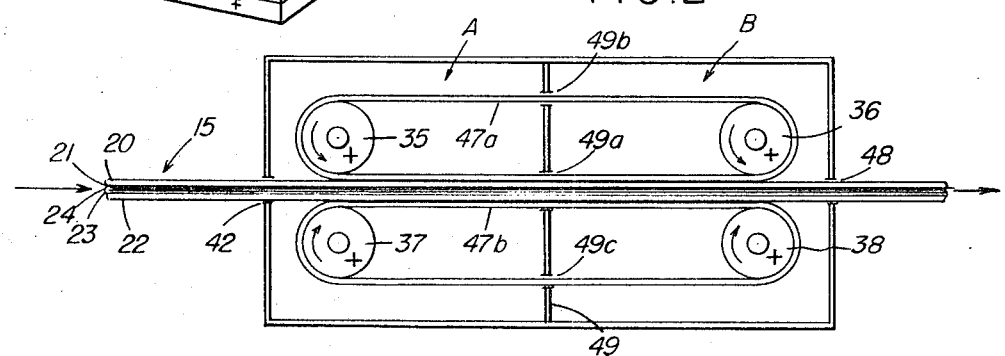
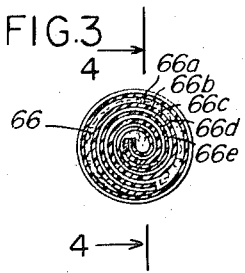
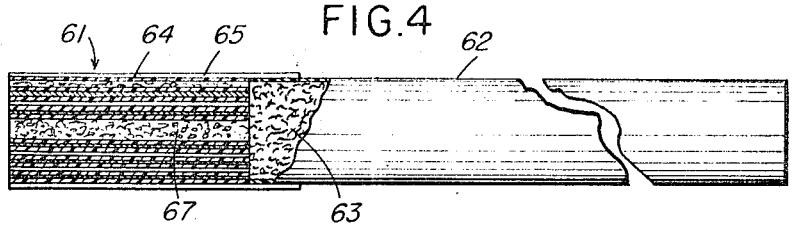
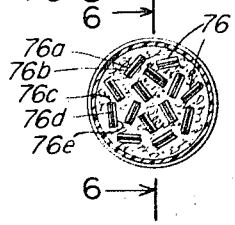
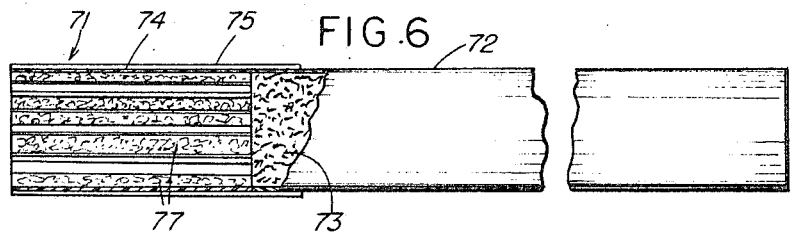
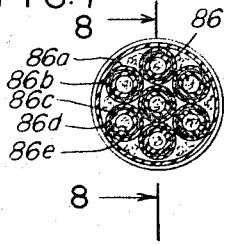
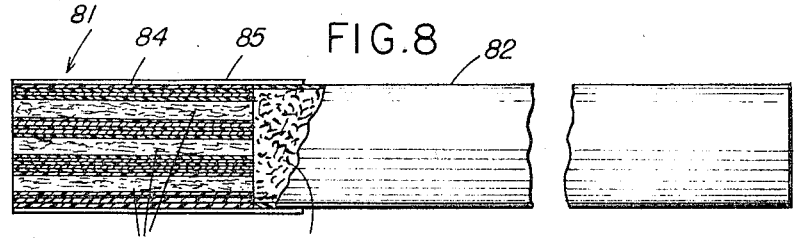

United States Patent Office 3,449,094
Patented June 10, 1969

3,449,094
LAMINATED ELECTRETS
Lawrence M. Baxt, John R. McDowell, and Lawrence L. Stewart, Richmond, Va., assignor to Phillip Morris Incorporated, New York, N.Y., a corporation of Virginia
Filed Oct. 23, 1965, Ser. No. 503,921
Int. Cl. B32b *15/04;* H01b *3/00;* H01f *29/00*
U.S. Cl. 29—195                                    6 Claims

ABSTRACT OF THE DISCLOSURE

An electrically charged sandwich structure including two electrets each having opposite sides one of which has an inherent layer of conducting material, and an electrically conductive adhesive joining the layers of conducting material.

---

This invention relates to electret structures, methods for their production and filters containing the same. More particularly, the present invention relates to electret structures comprising sandwiches made of pairs of metallized electrets prepared from metallized plastic sheets comprising a plastic having an electrical charge, to methods for preparing the same and to novel filter constructions embodying such sandwiches.

The term "electret" is employed throughout this specification to designate an electrified substance which exhibits electrical charges of opposite sign on opposite faces, the electrification being throughout the entire volume of the substance, rather than merely on its surface.

While electrets have been made of many materials, including carnauba wax and various additives, such as ester gums and the like, and including plastic materials such as polyvinyl chloride, there has been a definite need in the art for electrets having higher charges and longer life. The present materials not only possess high charges and long life but also are more useful for many applications than the presently known materials.

For example, the present electret structures are particularly useful in filters for tobacco smoke, since they possess relatively high charges, thereby permitting greater removal of undesirable materials from the tobacco smoke and since they permit simple but effective configurations of electrically charged materials in a filter heretofore unattainable with the known materials. For example, they permit simple but effective configurations of electrically charged materials in a filter wherein positive charges and/or minus charges appear on both sides of the structures.

By means of the present invention, novel electret structures are produced which possess properties superior to the properties of the electrets known in the art. In addition to being particularly useful in filters for tobacco smoke, the present electret structures have been found useful in other types of filters, such as air filters, and to be useful in devices such as electrometers, microphones and dosimeters.

The present electret structures are also particularly useful for the storage of information. They may be employed effectively as tapes and the like for the electronic storage of signals, as will be set forth in more detail later in this specification.

While metallized electrets of the type disclosed in copending application Ser. No. 503,983, filed of even date herewith and entitled Improved Method for the Manufacture of Electrets and Novel Electrets Produced Thereby, provide distinct advantages over the unmetallized electrets of the prior art, metallized electrets themselves are not completely satisfactory, for certain applications. The present electret structures provide advantages over and above the metallized electrets. For example, they eliminate image effects which might occur due to a metallized backing. In addition, they provide configurations of electrical charged materials and combinations of charges which have not heretofore been obtainable.

The novel structures or "electret sandwiches" of the present invention may be prepared from metallized electret-forming material of the type disclosed in our copending application Ser. No. 503,983, filed of even date herewith, referred to above, or from metallized electrets which are also described in said application.

The novel structures of the present invention comprise pairs of metallized electrets which are held together in such a manner that their conducting surfaces are in a parallel and substantially abutting relationship, whereby the charge electret layers of each metallized electret are positioned on either side of the resulting unit.

The two metallized electret-forming materials may be combined in sheet form or in smaller sections or sheets or the like by placing the metallized backing of two sheets or pieces of the metallized electrets in opposition and by adhering the same together with a suitable adhesive such as a thin layer of a polyester and/or a polyurethane adhesive or by an adhesive such as nitrocellulose, epoxy, or epoxy-polyamide. Alternatively, the novel structure of the present invention can be prepared by joining together two electret-forming materials by means of a conducting adhesive layer.

When the two metallized electrets are held together by means of a non-conducting layer, for example, a layer formed by a non-conducting adhesive of the type described above, the invention contemplates structures wherein the two conducting layers of the respective electrets are held together in such a manner that there is good electrical contact between the two conducting layers, for example, by means of conducting tabs which make good electrical contact between the two conducting layers.

A preferred method for obtaining good electrical contact between the two conducting layers in the electret structure of the present invention involves employing an adhesive layer containing within the adhesive sufficient particles of a material which is capable of imparting conductivity to the adhesive layer. For example, the adhesive layer may be an adhesive of the type described above containing particles of conducting carbon (e.g. acetylene black) within it. Particles may also be particles, such as copper, bronze, brass or graphite, if desired. Preferably, the particles imparting conductivity contained within the adhesive layer are uniformly distributed throughout said layer.

The resulting unit is, in effect, a unit having a layer with one charge on one side, a conducting layer in the center and a layer on the opposite side which may be the same charge or charge pattern and of the same magnitude or, in the case of multiple charges, of the same magnitudes as the first charged layer or which may be of a different charge and magnitude from the other conducting layer, depending on the results which are desired.

The metallized electrets which may be employed in the present invention may be prepared from an electret-forming material having a dipole moment of at least 0.1 debye and most preferably should have a dipole moment of at least 0.5 debye. The electret-forming material should also preferably have a volume resistivity of at least $10^{12}$, and most preferably $10^{14}$ ohm-cm., at room temperature. The electret-forming materials may, for example, be polymeric materials such as cellulose acetate, poly(vinylidene chloride), poly(chlorotrifluoroethylene), poly(tetrafluoroethylene), poly(vinylchloride), poly(methylmethacrylate) and, as set forth above, polyethylene terephthalate and the like.

The electret-forming materials may also be inorganic materials such as ceramics and the like. For example, they may be alkaline earth metal titanites, zirconates or the like.

The electret-forming material is preferably employed in the form of a sheet or film which may vary in thickness from about 0.1 to about 50 mils and which may be any desired width. For example, the sheet or film may be about 5 mils in thickness and may be an inch or less in width or it may be 10 feet or more in width.

The electret-forming material is provided with a layer of conducting material, such as metal or carbon which provides a backing for the electret-forming material.

The conducting material should, preferably, be in the form of a relatively uniform layer having a thickness of at least 100 Angstroms. The layer may be a deposited layer of aluminum, silver, nickel, copper, or the like; which has been applied by vacuum application, sputtering techniques, or by other means. Such a layer may vary from molecular thickness to 10 mils in thickness or more, so long as it functions as an electrical conductor. The conducting material might also be in the form of a sheet or film of metal, such as aluminum, tin, silver, nickel, copper, stainless steel, which is 0.01 mil to 1 inch or greater in thickness. The conducting material should, preferably, extend substantially across the entire surface of one of the charged surfaces of the electret-forming material.

Other conducting materials than metal or carbon may also be employed as the conducting layer, provided only that they can be held on the electret-forming material sufficiently well, can be made as a substantially uniform layer and are conducting in nature. For example, a thin layer of adhesive containing uniformly distributed graphite particles, carbon particles or conducting metal particles can function satisfactorily as the conducting layer.

For certain applications, it is advantageous to employ a magnetic material as the conducting layer. For example, the conducting layer may comprise a magnetic nickel-iron alloy which may be applied to the electret-forming material as a thin film. Other magnetic materials include iron, nickel and cobalt in various forms and combinations.

A particularly effective magnetic conducting layer can be made of nickel-iron alloys such as the Permalloys. These alloys and their methods of manufacture are discussed in detail on pages 227–334 of Physics of Thin Films, Advances in Research and Development, volume 1 (1963), edited by Georg Hass (Academic Press, New York and London).

Such a magnetic conducting layer serves a two-fold purpose and can be especially useful for applications involving the storage of large amounts of information, since the information can be retained both magnetically and electrically by such a material. Magnetic material of this type can also be utilized advantageously in applications involving filtration of charged aerosols.

If a metal sheet or film is employed, it may be held in place on the electret-forming material by means of a suitable adhesive or by partially melting or dissolving the electret-forming material so that it serves as an adhesive.

The metallized backing may be applied to either of the charge-bearing sides of the electret-forming material, i.e., to either the positive or negative side of said materials, if said material has already been formed into an electret.

The metallized backing may also be applied to the electret-forming material prior to its formation into an electret. Under such circumstances, the metallized backing, when in sheet form, may be applied to the electret-forming material by means of an adhesive. The metallized backing may also be applied by partially melting the electret-forming material and permitting the melted material to function as an adhesive. The metallic or metallized backing may also be applied to the electret-forming material, either before or after the electret-forming material has been converted to an electret, by conventional vacuum deposition techniques and the like. For example, a conventional commercially available sheet of metallized polyethylene terephthalate (metallized "Mylar"), can be employed effectively as the metallized electret-forming material for conversion to a metallized electret in accordance with the present invention.

It is advantageous to apply the metallized backing to the electret-forming material prior to the electret formation, since in such a case the metallized backing may serve as one of the electrodes during the electret-forming operation, wherein the charge is imparted to the electret-forming materials and the same is converted to an electret.

The metallized electrets employed in the present invention comprise electrets having two opposite sides, each having an electrical charge differing from the other, one of said sides having an adherent conductive layer attached thereto over substantially its entire surface. Thus, the term "metallized electrets" as used throughout this specification, is intended to encompass electrets having an adherent conductive layer attached thereto, whether the layer is made of metal, carbon or some other electrically conductive material. The conductive layer may be a sheet of conducting material, such as aluminum or tin foil, or may be a layer of conducting material, such as carbon particles, graphite, brass, copper or bronze particles which have been sprayed on, using a suitable adhesive, such as nitrocellulose, polyurethane, ethyl cellulose, waxes, and the like, or it may comprise a conducting material, such as aluminum, which have been vacuum deposited on the electret or electret-forming material or the conducting layer may be applied in some other suitable manner.

Electrets which may be employed in accordance with this invention may be prepared by either of the methods described in copending applications, Ser. Nos. 339,101, now abandoned, and 348,067, now U.S. Patent 3,316,620, or in the continuation-in-part application of application Ser. No. 339,101, which continuation-in-part application has been filed of even date herewith and is entitled Improved Method for the Manufacture of Electrets and Novel Electrets Produced Thereby.

As discussed above, the electrets may be prepared prior to or after the application of the metallized backing to the electret-forming material. In either case, the same conditions may be employed to convert the electret-forming material to electrets. The following discussion with regard to one general method which may be employed for the conversion of the electret-forming material to electrets applies equally as well to the production of electrets from electret-forming materials either with or without metallic backing.

While the process of the present invention is particularly valuable for the production of polyethylene terephthalate electrets, it can also be employed for the manufacture of other types of electrets employing electret-forming materials. Electret-forming materials which may be employed include many of the known electret-forming materials and similar electret-forming materials as set forth earlier in this specification.

The polyethylene terephthalate which may be employed in accordance with the present invention can be the conventional polymer in film form, for example, it may be film of the type marketed under the trade name Mylar. It may also comprise a solid piece of polyethylene terephthalate for example, a disk of this material, or it may comprise a solid material which is composed mainly of polyethylene terephthalate but which may contain minor amounts of other materials. It may also be coated with water repellant materials, such as silicone resin or polytetrafluoroethylene. It may also contain semiconductors or ferroelectrics such as barium or calcium titanate, or may be coated with resins containing such semiconductors or ferroelectrics.

The number average molecular weight of the polyethylene terephthalate material used is normally from about 15,000 to about 25,000. The size and shape of the piece of polyethylene terephthalate may vary. For example, it may be disk shaped, doughnut shaped, dumbbell shaped, pyramid shaped, or the like. However, it should preferably have two relatively flat surfaces which are on opposite sides of the piece, such as in a flat sheet or plate.

The electret-forming material may be in film or sheet form or may comprise a solid piece. The size and shape of the piece of electret-forming material may vary depending upon the particular embodiment of the process which is employed. However, it should preferably have two relatively flat surfaces which are on opposite sides of the piece, such as in a flat sheet or plate. For the continuous process embodiments for making the metallized electrets of the present invention, the electret-forming material should, as will be set forth in more detail later in this specification, be in such a form as permits such operation.

The process for producing the electret portion of the metallized electrets of the present invention comprises, in general, placing a solid piece of electret-forming material between two electrodes and applying an electric field by means of the two electrodes across the electret-forming material at an elevated temperature.

The electric field which is maintained across the electret-forming material during the preparation of the electret, in accordance with the process of the present invention, may vary from about 0.001 to about 1000 kv./cm., but is preferably about 50 to 200 kv./cm. The electric field is provided by means of any suitable direct current power supply, which is connected to at least one pair of electrodes, which, for example, may be flat plates. The voltage which is required will depend on the spacing of the electrodes. For example, when flat plates are employed, the voltage may be determined from the formula:

$$E = \frac{V}{d}$$

where E is the electric field (in kilovolts per centimeter), V is the voltage applied between the plates (in kilovolts), and $d$ is the distance between the plates (in centimeters). Thus, for example, a voltage of 4 kilovolts (4,000 volts) will be necessary to provide a field of about 200 kilovolts per centimeter, when the spacing between the plates is about 0.02 cm.

Before being placed between the electrodes, the electret-forming material, for example, polyethylene terephthalate, is either obtained or made into a suitable shape, for example, disk shaped plate shaped, sheet or rod shaped, or the like, tube shaped, bundles of tubes to use in filters, before undergoing the electret-forming steps of the present invention.

In a preferred embodiment of the present invention, the electret-forming material employed in the metallized electrets is preferably in the form of a sheet, ribbon, rod or other so-called continuous form, all of which, it will be understood, are encompassed by the word "sheet" as employed herein. As will appear later in this specification, the electret-forming material is for some embodiments of the invention preferred in flexible sheet form, as compared with sheet form, which includes flexible, semi-rigid and rigid forms of the material. The sheet can be moved through the electric field under conditions such that each portion of the sheet is suitably exposed to the necessary conditions of time, electrical field and temperature to obtain the desired result.

When the piece of electret-forming material is not in sheet form, it may be in the form of a piece which may vary greatly in size and shape. However, it will generally have a thickness of from about 0.25 to about 10 mils and, for convenience, will be referred to hereinafter as a disk, it being understood, however, that any suitable shape of electret-forming material may be employed.

In a most preferred method for preparing the metallized electrets which are used in the present invention, a sheet of metallized electret-forming material, preferably in a continuous form, i.e., in the form of a relatively long piece, is moved through a zone in such a manner that the metallized backing on the electret-forming material becomes an electrode and an electric field is created between the metallized backing and a second electrode, the electret-forming material passing through said electric field.

While the following discussion is directed primarily at the formation of a single electret, it is to be understood that more than one electret or metallized electret can be formed at a single time, the conditions of time, temperture and the like being substantially the same, except that the time and applied voltage will vary, depending on the number of disks or plates which are involved.

The disk may be placed between two disks of aluminum foil or similar material and for one embodiment of the invention, a stack of metallized disks is employed with the metallized portion dividing each electret-forming material from the next. The disk or disks are then placed between metal electrodes, such as stainless steel disks or any other suitable material, having the same shape or being sufficiently large to cover the entire surface of the disk made of electret-forming material, such as polyethylene terephthalate. Thus, for example, the resulting assembly, comprises a polyethylene terephthalate disk, sandwiched between two pieces of aluminum foil, each piece of aluminum foil being in contact with a stainless steel electrode. The electret-forming material should, preferably, be larger than the stainless steel electrodes by a margin or border of at least 20 millimeters in order to prevent any electrical breakdown in the surrounding atmosphere. The disk, for example, in an assembly such as described above, is heated, for example, in an oven, to a temperature which is at least as high as the glass temperature and which is no higher than the softening point of the electret-forming material. Thus, in the case of polyethylene terephthalate, this temperature may vary between about 80° C. and 170° C. The disk or assembly is brought to that temperature range in a preheating period or step which extends for a sufficient period of time to bring the disk or assembly to a uniform temperature, i.e., to a point at which there are virtually no temperature gradients in the disk. Preferably, the preheating is conducted at atmospheric pressure, although higher or lower pressures could be employed, if desired. The disk of electret-forming material may, alternatively, be preheated at these temperatures in the absence of the aluminum foil and stainless steel electrodes. In addition, material other than aluminum may be employed and other electrode materials may be employed. Preferably, however, the entire assembly is heated in this manner, since this facilitates the maintenance of the disk of electret-forming material at this temperature during the subsequent processing operations.

After the preheating step, the disk or assembly is subjected to a second step, wherein the electret-forming material is maintained at a temperature above the glass temperature and below the softening point of the electret-forming material. In the case of polyethylene terephthalate, the disk is normally maintained at a temperature of from about 80° C. to about 170° C. However, polyethylene, terephthalate may, for example, be heated at high as 600° C., provided that time is sufficiently short, for example, one microsecond, so that the disk does not soften. While the electret-forming material is maintained at the above-specified temperature, voltage is applied, for example, between stainless steel disks to give a field strength of from about 0.001 to about 1000 kilovolts per centimeter and, preferably, from about 50 to 200 kilovolts per centimeter. The voltage is maintained in this manner for a period of from about one millisecond to 12 hours or more and, preferably, from about 15 seconds to about 5 hours.

After the disk has been subjected to the above-described second step, it is subjected to a third step, wherein the voltage is continued at the same level as in the second step, but the heating is terminated and the disk is cooled by positive means, such as the passage of air therover, or is simply allowed to gradually cool, while still being kept in the same electric field. The disk may be cooled to a temperature as low as −30° C., or lower, but should be cooled to about 30° C., or below. Preferably, the disk is permitted to cool to about room temperature (about 20 to 30° C.) and is then recovered, for example, by removing it from the oven or other heat zone, while still keeping it in an electric field. This cooling step may take from about one microsecond to about 12 hours or more. It need not be done in the oven or other heating chamber where the second step is conducted but may be, if desired. The electret can then be separated from the electrodes and from the aluminum or similar foil, when such foil has been employed, and is then ready for use an an electret.

The electret can be, if desired, placed or maintained in a "keeper," for example, a wrapping of aluminum foil or the like, in order to preserve the charges thereon until use.

In another embodiment, a sheet or other continuous form of electret-forming material is passed through two temperature controlled zones, each of which is maintained in association with an electric field.

The electret-forming material may be in flexible sheet form, for example, in the form of 0.1–50 mil sheeting or may be in ribbon form, tape form or any other form which is relatively continuous in nature and which permits passage of the electret-forming material through several distinct zones in a relatively continuous operation. The electret-forming material for this embodiment is preferably constructed in such a manner that it possesses two relatively flat, relatively parallel surfaces which, after the electret is formed, will constitute the oppositely charged faces of the electret. The material is also preferably of such a nature chemically and physically that it can be made in sheet form or the like. Thus, the electret-forming material should be capable of formation, for example, by extrusion, in a relatively continuous form and, where it is to be passed through a non-linear path, it should also preferably be relatively flexible when in sheet form.

In the first zone through which the electret-forming material is passed, an electric field is maintained across the electret-forming material. The electric field may vary from about 0.001 to about 1000 kilovolts per centimeter and may be provided, for example, by means of flat plates between which the voltage is applied from a suitable source of direct current power supply. The temperature which is maintained in this first zone may vary from a temperature above the glass temperature to below the softening point of the electret-forming material. The electret-forming material is then passed through said first zone at a rate which is sufficient to maintain any one point on the electret-forming material in said zone for a period of from about one microsecond to 12 hours or more. When the electret-forming material is polyethylene terephthalate, which is the preferred material of the present invention, this zone should preferably be maintained at a temperature between about 80° C. and 170° C. and should, most preferably, be maintained at a temperature of from about 130° C. to 150° C.

In the second zone through which the electret-forming material is passed, an electric field is maintained across the electret-forming material. The electric field may vary from about 0.001 to about 1000 kilovolts per centimeter and may be provided by means of flat plates between which the voltage is applied from a suitable source of direct current power supply. The temperature which is maintained in this second zone may vary between about −30° and 30° C. and is, preferably, between about 20° C. and 30° C. and the electret-forming material is passed through said second zone at a rate which is sufficient to maintain any one point on the electret-forming material in said zone for a period of from about one millisecond to 12 hours or more. When the electret-forming material is polyethylene terephthalate, which is the preferred material of the present invention, this zone should be maintained at a temperature between about −30° C. and 30° C., and, preferably, at a temperature of from about 20° C. to 30° C.

The first zone may comprise the space between conducting plates, such as highly polished steel plates, which are heated to a temperature which is sufficient to maintain the zone between the plates at the desired level and between which the desired voltage is maintained, or may comprise the space between heated rolls, such as polished aluminum or steels rolls, which are sufficient to accomplish the same result. Similarly, the second zone may be so constructed that the desired temperature, electric field and time relationships can be maintained. Alternatively, combinations of hot and cold plates, rolls, belts and the like may be employed to accomplish the desired result.

The conducting layer may, if desired, be applied to the electret after it has been formed. Preferably, however, the conducting layer is applied to the electret-forming material prior to its conversion into an electret. As wil lbe described hereinafter, operating in this manner permits simplified and improved methods of manufacture.

The continuous process for manufacturing electrets can have various modifications in order to accomplish the desired result. Some of these modifications are illustrated in our copending application which is referred to earlier in this application and which is a continuation-in-part of application Ser. No. 339,101. They include maintaining a roll of electret-forming material in an oven or suitably heated enclosure at the desired temperature and maintaining charged rollers in the same oven or heated enclosure, whereby the length of time during which the roll of electret-forming material is subjected to the electric field can be much less than the length of time during which the roll of material is subjected to the desired degree of heating. In such an apparatus, the charged electret-forming material can then be passed through an enclosure or cold box where it is rapidly chilled by suitable means. The electrical charge can be imparted to the film in the hot box by means of hot charged rollers which set up a direct current field across the film and which also serve to heat the film.

In another embodiment of the continuous process, the electret-forming film and the electrically charged rolls need not be heated but the film can be preheated by allowing it to remain in an oven or other suitable zone for sufficient time to reach thermal equilibrium before it is passed between charged rollers, provided that the film retains sufficient heat to beat the proper temperature required during the application of the field.

In still another embodiment of the continuous process of the present invention, a film of electret-forming material having a conducting coating can be passed with its electret-forming material in contact with charged plates which are sufficiently long so that the film will be preheated by a hot end of the plates and, thereafter, subjected to the charging current imposed between said plates and brushes in contact with the conducting material, while at the proper temperature and thereafter passed between the cooled end of similarly arranged charged plates and brushes so that the film emerges at the desired low temperature.

As another embodiment of the process, an electret-forming film having a conducting layer is passed by means of a metal belt through a hot zone and then a cold zone, with the electret-forming material in contact with said metal belt, brushes being positioned above the carrying metal belt and in contact with the conducting layer, a charge being passed between the brushes and the belts during the time that the film is conveyed through the hot zone and then the cold zone.

Obviously, many other combinations of belts, plates, rollers and the like could be employed, so long as the film or other form of the electret-forming material is passed through the two temperature zones as required.

We have noted certain factors with regard to the formation of electrets, which factors have a bearing on the nature of the charge which can be produced in the electrets. In view of these factors, a particularly preferred electret for use as the metallized electrets employed in the present invention is an electret having substantially all of its charges in heterocharge form. In order to accomplish such a result, the conditions which must be employed in its manufacture are critical. These conditions will be set forth below.

The electret-forming material, such as polyethylene terephthalate, is placed between electrodes and heated by suitable means, such as those set forth above, to a temperature which is at least as high as the glass temperature, but below the softening temperature of the electret-forming material. An electric field is then applied across the electret-forming material by means of the electrodes. The resulting material is then rapidly cooled, while the electric field is applied across it. Cooling, for example, by means of circulating coolants, to a low temperature, such as from 30° C. to —100° C., or even lower, such as —270° C., should preferably be achieved in a period of from about one microsecond to one minute.

The invention contemplates in one embodiment, the proper orientation of heating and cooling means, as well as the proper orientation of other means for providing the electric field across the electret-forming material to achieve the maximum exposure of the electret-forming material under conditions favoring heterocharge formation and the minimum exposure of the electret-forming material under conditions favoring homocharge formation. For example, if homocharge formation is relatively fast, a short time is indicated for the application of an elevated temperature; if homocharge formation is relatively slow, longer times can be employed with little diminution in the net heterocharge.

In the manufacture of electrets, it is of advantage from a commercial viewpoint to manufacture the electrets by a continuous process. Such a process would normally involve the use of rolls similar to those described earlier in this specification, whereby the electret-forming material passes around and by said rolls, which are heated or cooled in accordance with the particular requirements of the system. One problem which results from manufacturing in this manner arises from the fact that different lengths of time are required for contact of the material with the electric field and exposure of the material to the high or low temperatures which are required. Configurations which are particularly advantageous in order to achieve the desired degree of electrical contact and temperature control will be discussed later in this application.

One of the most effective methods for utilizing a continuous process for the production of metallized electrets involves the use of metallized backing as an electrode. Thus, particularly preferred embodiments of the present invention include the continuous production of metallized electrets by means of methods wherein the metallized backing on the electret-forming material is contacted by suitable means, for example, brushes or rollers, to impart a charge thereto and an opposite charge is imparted to the side of the electret-forming material which is opposite the metallized or conducting backing on the metallized electret. While the charge is applied, the metallized electret-forming material is passed through a high temperature zone and a low temperature zone, under similar conditions to those set forth earlier in this specification.

Electret structures or sandwiches formed in accordance with the present invention may be used in filters for tobacco smoke, as will be discussed in more detail later in this application. They may, for example, be used in a cigarette filter by being cut into pieces about 0.5 mils thick by 2 mm. wide by 5–20 mm. in length and crimped or uncrimped placed in a longitudinal direction within a conventional filter cylinder in such a manner that one end of each piece of coducting material in the electret structure is in contact with the smoker's mouth, i.e. is grounded by means of the moisture in the smoker's mouth.

The effectiveness of the present materials as components of filters for tobacco smoke is based on the fact that they are capable of removing charged particles therefrom.

The non-gaseous portion of cigarette smoke is generally composed of three types of particles, on an electrical basis. There are, in general, positively charged particles, negatively charged particles and neutral particles. Generally, approximately half or somewhat less of the particles in tobacco smoke are electrically neutral and the remainder of the particles are about evenly divided between positive particles and negative particles.

The removal of charged particles from tobacco smoke has often been found desirable, in order to selectively eliminate undesirable smoke constituents and to aid in overall filter efficiency.

The removal of certain charged particles is also believed to accomplish certain physiological and psychological effects.

Filters incorporating the electret structures of the present invention provide a means for the controlled removal of one or both kinds of charged particles from tobacco smoke. They can be employed as well in any other application in which particulate matter is to be removed from a gaseous medium.

While electrets have been employed to remove certain charged particles from tobacco smoke, they have been found to have limited effectiveness for this purpose for a number of reasons. For example, the fact that the electrets possess different charges on each face does not permit a net field when they are used in a filter or other device. Thus, there is no opportunity for selectivity in employing such materials unless unusual and difficult steps are taken to incorporate the electrets in the filter structure in such a manner that the charges can be adequately controlled to accomplish a desired result. In other words, there is no effective way in which to ground such electrets.

Metallized electrets overcome many of the disadvantages of the ordinary electrets and make possible a new type of electrically charged material for use in filters. The use of the metallized electrets in filters, as disclosed in our copending application referred to earlier in this specification, permits the advantageous distribution of single charges in a filter with the accurate control of the charge distribution within the filter. The present electret "sandwich" structures provide even greater advantages in filter applications, since they can be given varying charges, by a simple method, and can thereby provide unique and advantageous configurations of charge patterns in filter constructions.

The present electret structures also make possible a new type of material and a new method for the storage of information. They can be employed as electronically-responsive tapes for use in tape recorders and similar devices, being adaptable to the superimposition on the charged electret surface of a pattern of electronic signals which may be imparted thereto under conditions similar to those set forth earlier in this application or under conditions set forth in our copending application, filed of even date herewith, entitled Improved Method for the Manufacture of Electrets and Novel Electrets Produced Thereby. They permit the storage of electrically recorded information, simultaneously on two sides of a tape, with no interference between sides.

It is possible to employ an electret sandwich tape upon which a series of signals are superimposed on each side by suitable means such that each side of the tape becomes, in effect, a series of electrets which are connected together, either directly or with intervals where no charge is imposed on the electret-forming material. Such tapes are particularly valuable when the metallized backing on the electret-forming material is magnetic in nature, since such tapes permit the superimposition thereon of a plurality of signals, both electric and magnetic, to permit the simultaneous recording of several signals along the same length of tape. Such tapes have obvious value for such fields as television recording, wherein a visual signal and a stereophonic audio signal are simultaneously received and recorded.

The ability of the present double surfaces of a tape made from the electret sandwiches to hold electrical charges of varying degree and/or opposite sign, even though those charges are immediately adjacent to one another or opposite one another on the tape, permits the utilization of these materials as recording tapes as indicated above, and also permits their use in the manufacture of filter elements. Such filter elements can have a variety of charges in a variety of patterns and can be shaped in accordance with a multitude of designs for filter applications in such a manner that positive and negative charges can be formed in many different arrays in order to best accomplish the purposes of the particular aerosol filtration involved. It is particularly advantageous, for certain applications, that the metallized backing be magnetic in nature so that a particular filter construction can employ electric as well as magnetic means for the removal of undesirable particles from the aerosol.

The invention is more fully illustrated in the attached drawing, wherein:

FIG. 1 is a schematic view of one embodiment of the present invention.

FIG. 2 is a schematic view of a second embodiment of the present invention.

FIG. 3 is a schematic view of the third embodiment of the present invention.

FIG. 4 is a schematic view of a fourth embodiment of the present invention.

FIG. 5 is a schematic view of a fifth embodiment of the present invention.

FIG. 6 is a schematic view of a sixth embodiment of the present invention.

FIG. 7 is a schematic view of a seventh embodiment of the present invention.

FIG. 8 is a schematic view of an eighth embodiment of the present invention.

Referring more particularly to FIG. 1, an electret structure or "sandwich" 5 is shown in isometric view. A layer of electret-forming material 10 is shown with a conducting layer 11 attached thereto. A similar layer of electret-forming material 12 with a conducting layer 13 attached thereto is attached along the surface of conducing layer 13 to the surface of conducting layer 11 by means of adhesive layer 14. In the electret-forming materials, positive charges are indicated at A and negative charges are indicated at B. In the conducting layers, positive charges are indicated at C and negative charges are indicated at D.

Referring more particularly to FIG. 2, a preferred method for producing the electret sandwiches of the present invention is schematically illustrated. In FIG. 2 a sandwich 15 comprises successive layers as follows: electret-forming layer 20, conducting layer 21, adhesive layer 24, conducting layer 23 and electret-forming layer 22, introduced into zone A through opening 42. Zone A is maintained at a temperature above the glass temperature of the electret-forming material.

Conducting layers 21 and 23 are grounded. Positively charged rolls 35, 36, 37 and 38 move in the indicated directions, whereby belts 47a and 47b are moved in the indicated directions carrying sandwich 15 through zones A and B, passing from zone A through opening 49a to zone B and out of zone B through opening 48. Belts 47a and 47b are made of a conducting material, such as polished stainless steel and the charge on rolls 35 and 36 and 37 and 38 are imparted to belts 47a and 47b, respectively, whereby a field is formed between the surface of belts 47a and 47b and the conducting layers 21 and 23, respectively, of sandwich 15.

After the sandwich 15 has been maintained in zone A for a sufficient period of time to meet the conditions required for the first treatment of the two metallized electret-forming films forming parts of the sandwich, i.e., wherein the voltage maintained between belts 47a and 47b and conducting layers 21 and 23, respectively, a field strength of from about 0.001 to about 1000 kv./cm. over a period of from about one microsecond to 12 hours or more, the sandwich 15 is passed through opening 49a into zone B wherein it is maintained at a temperature below about 30° C. until the sandwich 15 has attained a temperature below 30° C. The completed sandwich leaves zone B through opening 48. Belt 47a passes between the two zones through openings 49a and 49b as indicated. Belt 47b passes between the two zones through openings 49a and 49c as indicated.

Referring more particularly to FIGS. 3 and 4, there is shown a cigarette 61 having a paper cylinder 62, defining the body of the cigarette. Shredded tobacco 63 (also referred to herein as "filler") is contained within cylinder 62. Paper cylinder 64 is positioned at the other end from the shredded tobacco so that its end abuts one end of paper cylinder 62. Cylinder 64 generally defines the filter unit of cigarette 61. The filter unit, which is defined by paper cylinder 64 is joined to the filler section, which is defined by paper cylinder 62, by paper cylinder 65, which covers all of paper cylinder 64 and a portion of paper cylinder 62. The filter section defined by paper cylinder 64 contains an electret sandwich 66, having electret layer 66a, which has a positive charge on its outer surface, conducting layer 66b, adhesive layer 66c, conducting layer 66d and electret layer 66e, which has a positive charge on its outer surface. The metallized electret 66 is generally spirally wound within cylinder 64, as indicated. In this embodiment, the spaces formed by electret sandwich 66 in cylinder 62 are filled by cellulose acetate fibers 67, although other filter materials may be employed, if desired, or the space may be left empty. It is important, however, that conducting layers 66b and 66d be in contact with the smoker's mouth, and are thereby grounded, when cigarette 61 is smoked.

Referring more particularly to FIGS. 5 and 6, there is shown a cigarette 71 having a paper cylinder 72, defining the body of the cigarette. Shredded tobacco 73 (also referred to herein as "filler") is contained within cylinder 72. Paper cylinder 74 is positioned at the other end from the shredded tobacco so that its end abuts one end of paper cylinder 72. Cylinder 74 generally defines the filter unit of cigarette 71. The filter unit, which is defined by paper cylinder 74 is joined to the filler section, which is defined by paper cylinder 72, by paper cylinder 75, which covers all of paper cylinder 74 and a portion of paper cylinder 72. The filter section defined by paper cylinder 74 contains electret sandwiches 76, each of which has an electret layer 66a, which has a positive charge on its outer surface, conducting layer 66b, adhesive layer 66c, conducting layer 66d and electret layer 66e, which has a positive charge on its outer surface. The electret sandwiches 76 are positioned substantially longitudinally in cylinder 72 with one end of each conducting layer 76b and 76d extending to the end of the filter, so that each conducting layer is in contact with the smoker's mouth, and is thereby grounded. In this embodiment, the spaces formed by electret sandwiches 76 in cylinder 72 are filled with cellulose acetate fibers 67, although other filter materials may be employed, if desired, or the space may be left empty.

Referring more particularly to FIGS. 7 and 8, there is shown a cigarette 81 having a paper cylinder 82, defining the body of the cigarette. Shredded tobacco 83 (also referred to herein as "filler") is contained within cylinder 82. Paper cylinder 84 is positioned at the other end from the shredded tobacco so that its end abuts one end of paper cylinder 82. Cylinder 84 generally defines the filter unit of cigarette 81. The filter unit, which is defined by paper cylinder 84 is joined to the filler section, which is defined by paper cylinder 82, by paper cylinder 85, which covers all of paper cylinder 84 and a portion of paper cylinder 82. The filter section defined by paper cylinder 84 contains a plurality of electret sandwich cylinders 86, each having electret layer 66a, which has a positive charge on its outer surface, conducting layer 66b, adhesive layer 66c, conducting layer 66d and electret layer 66e, which is here shown having a positive charge on its outer surface. The cylinders 86 are positioned substantially longitudinally in cylinder 82 with one end of each of the conducting layers 86b and 86d extending to the end of the filter, so that each is in contact with the smoker's mouth, and is thereby grounded. In this embodiment, the spaces formed by metallized electrets 86 in cylinder 82 are filled with cellulose acetate fibers 87, although other filter materials may be employed, if desired, or the space may be left empty.

Example 1

A Mylar electret sandwich (aproximately 2 mils thick) is cut into a strip 22 cm. long and 1.5 cm. wide. The electret is charged positively on both sides at about $10^{-8}$ coulombs/cm.$^2$. The strip is cut into pieces and inserted into a tube 30 mm. long. The tube is then affixed to a cigarette with adhesive tape. The same type cigarette without the electret filter tube is used as the control. The following procedures are used to determine the net charge on the smoke of both the control and the experimental cigarettes. A sequence Smoker (General Electric design), a Charge Collector (G.E. design), a micro-micro-ammeter (Keithley 410), a Smoke Charge Integrator (Jefferson Research Laboratories), a Space Charge Control Consol (G.E. design), a Fisher Air Pump, and a Texas Instrument Rectiriter (10 mv.) are assembled and calibrated. The cigarettes to be tested are weighed and their resistance-to-draw (RTD) is determined. First, the control cigarette is placed in the smoker ports of the sequence smoker. The vacuum pump is engaged and the Dwyer flow gauge of the Control Consol is adjusted to 2.4 (1050 cc./min.). The micro-micro-ammeter is zeroed, the integrator function knob is turned to "Operate," and the recorder chart drive is engaged. The sequence smoker drive motor is engaged, and the cigarette is lighted as the port in use passes the vacuum take-off position. As the cigarette is lighted, a stop watch is engaged. When approximately 35 seconds have elapsed after puffing, the integrator function knob is turned to "set". This returns the recorder pen to midscale. After 55 seconds have elapsed from puff time, the function knob is returned to "operate" position in preparation for the next puff. This procedure is followed until completion of the run with both the control and the experimental cigarettes.

The net charges are calculated from this formula:

$$\text{Charge} = \left(\frac{\text{recorder deflection}}{\text{full scale deflection}}\right)$$

[Integrating time (sec.)]$^{\mu\mu}$ ammeter sensitivity (amps.

the average of ten puffs for the control cigarette is determined as $(-1.3+0.8) \times 10^{-11}$ coulombs per puff. The cigarettes with the electrostatic filter result in a charge on the smoke of $+2.1 \times 10^{-10}$ coulombs/puffs, showing that a selective removal of particles from the smoke having one charge or the other had been achieved.

Example 2

A sandwich of one mil aluminized Mylar was made, using a polyurethane adhesive. This was made into a unicharged electret by applying a potential of 600 volts to each side for 10 seconds so that the overall charge was positive and had an average value of $4\pm1 \times 10^{-9}$ coulombs/cm.$^{-2}$. By grounding the aluminum backings and applying a negative potential of 700 volts, on a knife-edge, parallel negative lines were printed on the positive background about $4\pm1$ mm. apart. This was cut to $20\times1.5$ cm. so that the negative lines ran at about a 45° angle to the edge. The electret was then inserted into a glass tube which was affixed to the same type of cigarette as used in Example 1. The control and test cigarettes were smoked and the net charge on the smoke was determined as described in Example 1. The charge on the smoke was changed from $-1.3 \times 10^{-11}$ to $+3.4 \times 10^{-10}$ coulombs/puff.

Example 3

An adhesive was not used for this experiment. Two electrets of one mil aluminized Mylar were made by applying to each a potential of $-3$ kilovolts for 10 seconds. A charge of $-24 \times 10^{-9}$ coulombs/cm.$^2$ was obtained. These two discs were then placed with the aluminized backing touching and were grounded. In this configuration, each side had an electric charge of $-24 \times 10^{-9}$ coulombs/cm.$^2$.

As used throughout this specification, unless otherwise specified, all parts and percentages are by weight. In addition, the following definitions apply:

Dipole moment is a mathematical entity. It is the product of one of the charges of a dipole unit and the distance separating the two charges in said dipole unit.

Volume resistivity is the resistance that a centimeter cube of asubstance offers to the passage of electricity, the current being perpendicular to the two parallel faces of the cube.

Glass temperature, which may also be referred to as glass transition temperature or as second order transition temperature, is the temperature at which the free energy, entropy and enthalpy curves are continuous and the heat capacity curve is discontinuous for an amorphous polymer or in an amorphous region of a crystalline polymer. The glass temperature is characterized as the point at which there is a change in the molecular freedom of a material and is further characterized as a point of change between a rigid state or structure of a material and a rubbery state of a material.

Melting point, which may also be called first order transition temperature, is the temperature at which the free energy curve is continuous and the entropy, enthalpy and heat capacity curves are discontinuous.

Softening point, also called the softening temperature, is a point below the melting point of a material. In amorphous high molecular weight polymers, no sharp melting point is usually observed. The region of temperature or transition point at which a substance without a sharp melting point changes from viscous flow into plastic flow, as determined by a plastometer, is called the softening point. It is to be noted that when no softening point is generally attributed to a material, this invention contemplates the melting point as the upper limit of the temperature ranges involved herein.

We claim:

1. An article of manufacture comprising an electret having at least two substantially parallel surfaces, one of said surfaces having adhered thereto a layer of conducting material, a second electret having at least two substantially parallel surfaces, one of said surfaces having adhered thereto a layer of conducting material, and an intermediate layer of adhesive material binding said two electrets together by means of the respective layers of conducting material in such a manner that electrical contact is maintained between said two conducting materials.

2. The article of manufacture of claim 1 wherein the adhesive layer contains particles of a conducting material uniformly distributed therethrough in sufficient amount so that said adhesive layer is rendered electrically conductive.

3. The article of manufacture of claim 2 wherein said conducting particles are particles of carbon.

4. The article of manufacture of claim 2 wherein said conducting particles are metallic particles.

5. An article of manufacture comprising an electret having at least two substantially parallel surfaces, one of said surfaces having adhered thereto a sheet of metallic material, a second electret having at least two substantially parallel surfaces, one of said surfaces having adhered thereto a sheet of metallic material, and an intermediate layer of adhesive material binding said two electrets together by means of the respective sheets of metallic material in such a manner that electrical contact is maintained between said two sheets of metallic material.

6. An article of manufacture comprising two electrets, each of which has at least two substantially parallel surfaces, one of the said parallel surfaces of one electret having adhered thereto a layer of conducting material, said layer of conducting material also having adhered thereto one of said parallel surfaces of the second electret, whereby a structure results having two substantially parallel electrets joined together by a conducting material.

References Cited

UNITED STATES PATENTS

| | | | |
|---|---|---|---|
| 2,740,184 | 4/1956 | Thomas | 161—64 X |
| 2,916,038 | 12/1959 | Wade | 131—262 X |
| 3,005,707 | 10/1961 | Kallmann et al. | 96—1 |
| 3,138,517 | 6/1964 | Charbronneau | 161—214 X |
| 3,268,331 | 8/1966 | Harper | 96—1 |
| 3,316,620 | 5/1967 | Stewart | 161—411 X |
| 3,354,373 | 11/1967 | Fatovic | 307—88 X |
| 3,359,145 | 12/1967 | Salyer et al. | 156—331 X |

OTHER REFERENCES

Gutmann, F.: "The Electret," Reviews of Modern Physics, vol. 20, No. 3 (July 1948), pp. 457–471.

"Foil Stabilities Electret Mike," Electronics, Oct. 25, 1963, p. 68.

EARL M. BERGERT, *Primary Examiner.*

R. A. KILLWORTH, *Assistant Examiner.*

U.S. Cl. X.R.

131—262; 161—213, 411; 252—63.2; 307—88; 317—3